US008532795B2

(12) United States Patent
Adavi et al.

(10) Patent No.: US 8,532,795 B2
(45) Date of Patent: Sep. 10, 2013

(54) METHOD AND SYSTEM FOR OFFLINE CODE VALIDATION

(75) Inventors: Visweswara Prasad Adavi, Andhra Pradesh (IN); Raja Balasubramaniam, Karnataka (IN)

(73) Assignee: General Electric Company, Schenectady, NY (US)

( * ) Notice: Subject to any disclaimer, the term of this patent is extended or adjusted under 35 U.S.C. 154(b) by 270 days.

(21) Appl. No.: 12/897,007

(22) Filed: Oct. 4, 2010

(65) Prior Publication Data

US 2012/0083904 A1    Apr. 5, 2012

(51) Int. Cl.
*G05B 13/02* (2006.01)
*G06F 7/60* (2006.01)
*G06F 17/10* (2006.01)
*G06G 7/48* (2006.01)

(52) U.S. Cl.
USPC ............. 700/30; 700/31; 700/39; 700/44; 703/2; 703/6

(58) Field of Classification Search
USPC ............. 700/28–31, 38, 39, 44, 52, 83, 86; 703/2, 6
See application file for complete search history.

(56) References Cited

U.S. PATENT DOCUMENTS

| 5,394,322 | A  |   | 2/1995  | Hansen              |         |
|-----------|----|---|---------|---------------------|---------|
| 6,278,899 | B1 | * | 8/2001  | Piche et al.        | 700/44  |
| 7,474,929 | B2 | * | 1/2009  | Nixon et al.        | 700/83  |
| 7,505,877 | B2 |   | 3/2009  | Salsbury            |         |
| 7,729,789 | B2 |   | 6/2010  | Blevins et al.      |         |
| 7,734,608 | B2 |   | 6/2010  | Fell et al.         |         |
| 7,739,606 | B2 |   | 6/2010  | Sawada et al.       |         |
| 2003/0046130 | A1 | * | 3/2003 | Golightly et al.   | 705/7   |
| 2003/0233404 | A1 |   | 12/2003 | Hopkins            |         |
| 2004/0243636 | A1 | * | 12/2004 | Hasiewicz et al.  | 707/104.1 |
| 2009/0117647 | A1 | * | 5/2009  | Buddhi Srinivasa et al. | 435/289.1 |

FOREIGN PATENT DOCUMENTS

| JP | 11219209 A | 8/1999 |
|----|------------|--------|
| JP | 2006163657 A | 6/2006 |

* cited by examiner

*Primary Examiner* — Crystal J Barnes-Bullock
(74) *Attorney, Agent, or Firm* — Armstrong Teasdale LLP

(57) ABSTRACT

A method of offline code validation and a process control system are provided. The system includes a plurality of sensors each configured to generate a sensor output value representative of a respective sensed parameter in a process plant, at least one process controller configured to receive one or more of the sensor output values and to generate a controller output value using the one or more of the sensor output values and a control algorithm associated with the at least one process controller, a plurality of controlled components configured to receive an associated controller output value, and an offline computing environment including a selectable model controller configurable to represent the at least one process controller, the model controller selectable by a user from code representing the at least one process controller and displayed on a user interface.

10 Claims, 3 Drawing Sheets

METHOD AND SYSTEM FOR OFFLINE CODE VALIDATION

BACKGROUND OF THE INVENTION

The field of the invention relates generally to an offline code validation tool, and more specifically, to a method and system for simulating a selected portion of control logic.

Distributed process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

During commissioning and/or maintenance of process plants, users routinely make modifications to control logic of the process controllers while the process controller is online, that is, while the process controller is actively controlling a process, because validation of the intended modification is not possible until the control logic code is downloaded onto the process controller and then is permitted to act on the process. However, placing the untested control logic changes into service can yield unpredictable results.

BRIEF DESCRIPTION OF THE INVENTION

In one embodiment, a process control system includes a plurality of sensors each configured to generate a sensor output value representative of a respective sensed parameter in a process plant, at least one process controller configured to receive one or more of the sensor output values and to generate a controller output value using the one or more of the sensor output values and a control algorithm associated with the at least one process controller, a plurality of controlled components configured to receive an associated controller output value, and an offline computing environment including a selectable model controller configurable to represent the at least one process controller, the model controller selectable by a user from code representing the at least one process controller and displayed on a user interface.

In another embodiment, a method of offline code validation includes selecting an offline model of an online process controller from a plurality of selectable models, capturing from the online process controller operating in an online environment a snapshot of a current state of the online process controller, establishing the captured state in the model controller, modifying a control parameter of the model controller, executing the model controller using the snapshot and the modified control parameter in an offline environment separate from the online environment, and comparing an output of the executed model controller to the output of the online process controller.

In yet another embodiment, an offline code validation system includes an online computing environment, a process controller operable in the online computing environment to receive input values from one or more sensors and to generate output values using executable process controller code and the input values, an offline computing environment executing concurrently with the online environment, and an offline model of the process controller operable in the offline computing environment to receive input values from at least one of the one or more sensors and an input value generator and to generate output values using executable offline model code and the input values.

BRIEF DESCRIPTION OF THE DRAWINGS

FIG. 1 is a schematic block diagram of a process control system in accordance with an exemplary embodiment of the present invention;

FIG. 2 is a diagram of a method of offline code validation in accordance with an exemplary embodiment of the present invention; and FIG. 3 is a schematic block diagram of an offline code validation system that may be used with the process control system shown in FIG. 1.

DETAILED DESCRIPTION OF THE INVENTION

The following detailed description illustrates embodiments of the invention by way of example and not by way of limitation. It is contemplated that the invention has general application to providing a platform for on-site modification and validation of control code prior to download in to a physical control system in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

In existing control environments the confidence level of a successful implementation of a control logic modification is relatively low because validation of the modification is not possible until the control logic code is downloaded and begins acting on process. Embodiments of the present invention permit the validation of the logic code as an option of the logic code modification procedure for critical modifications by providing a simulation platform for on-site modification and validation prior to download of the modified control logic into a physical control system. This platform also enables optimization of the existing control boundary.

Figure 1:
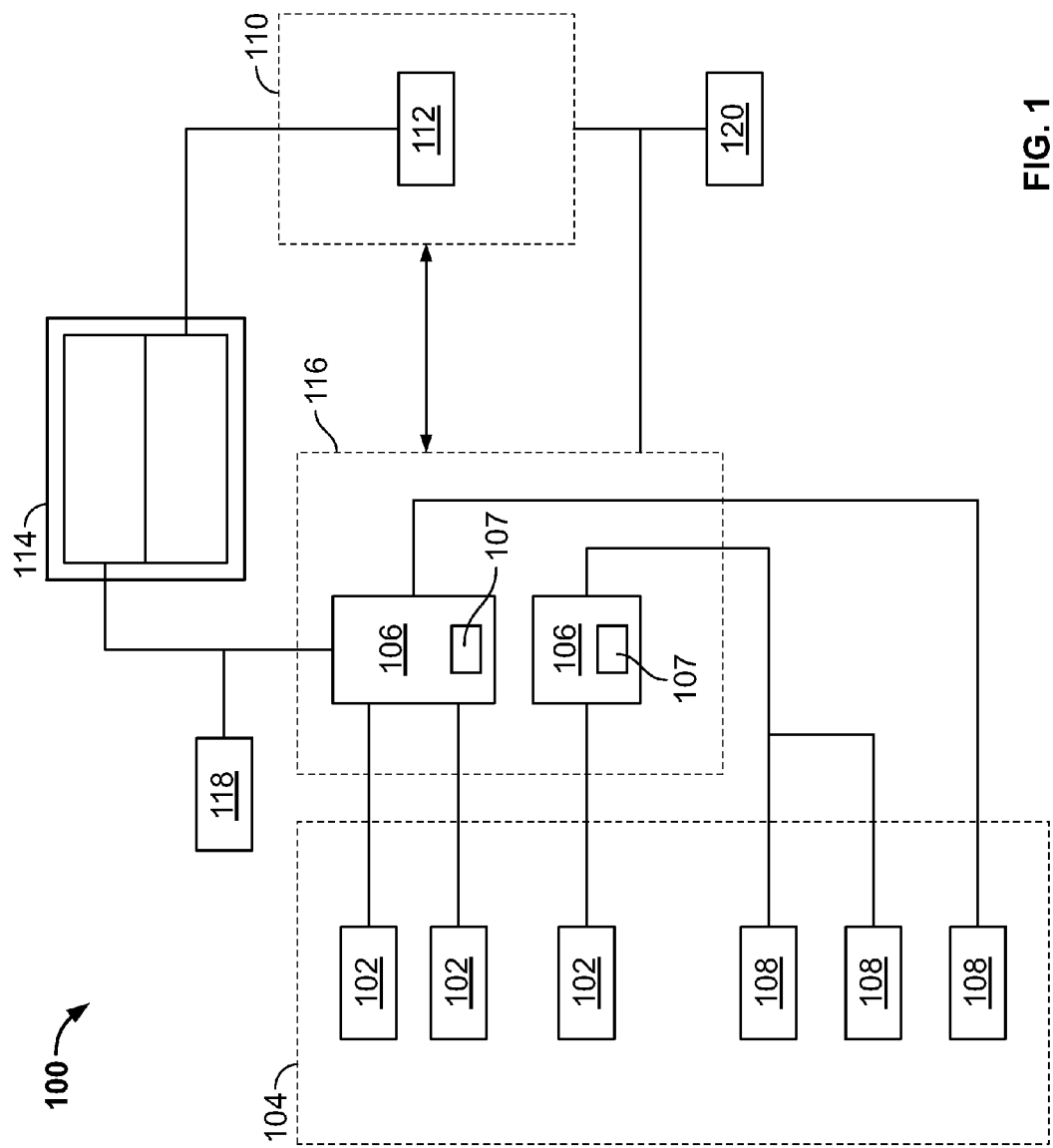
FIGS. 1-3 show exemplary embodiments of the method and system described herein.

FIG. 1 is a schematic block diagram of a process control system 100 in accordance with an exemplary embodiment of the present invention. In the exemplary embodiment, process control system 100 includes a plurality of sensors 102, each configured to generate a sensor output value representative of a respective sensed parameter in a process plant 104. Process control system 100 also includes at least one process controller 106 configured to receive one or more of the sensor output values and to generate a controller output value using the one or more of the sensor output values and a control algorithm 107 associated with at least one of process controllers 106, a plurality of controlled components 108 configured to receive an associated controller output value, and an offline computing environment 110 comprising a selectable model controller 112 configurable to represent at least one of process controllers 106. Model controller 112 is selectable by a user from code representing at least one of process controllers 106 and displayed on a user interface 114.

Process control system 100 also includes an online computing environment 116 communicatively coupled to offline computing environment 110 through user interface 114 or directly between the two environments. Offline computing environment 110 is configured to receive a representation of a selected model controller 112 from online computing environment 116. Offline computing environment 110 is viewable on user interface 114 simultaneously with online computing environment 116. User interface 114 is configured to permit the user to adjust a parameter of model controller 112. Offline computing environment 110 and online computing environment 116 operate using a processor 120

Process control system 100 further includes a data storage device 118 configured to store historical data representing input data received by process controller 106.

Figure 2:
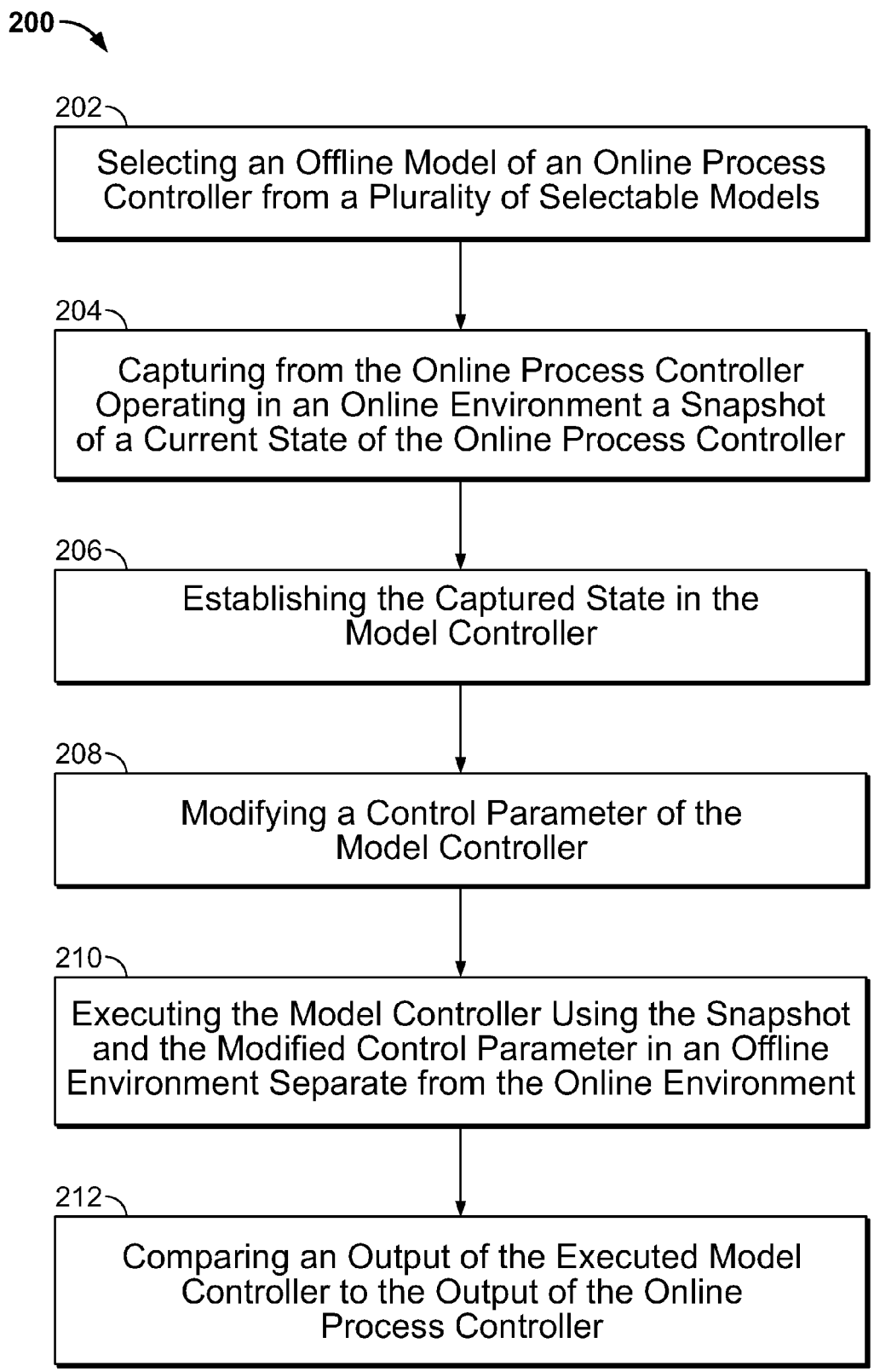

FIG. 2 is a diagram of a method 200 of offline code validation in accordance with an exemplary embodiment of the present invention. In the exemplary embodiment, method 200 includes selecting 202 an offline model of an online process controller from a plurality of selectable models, capturing 204 from the online process controller operating in an online environment a snapshot of a current state of the online process controller, and establishing 206 the captured state in the model controller. Method 200 also includes modifying 208 a control parameter of the model controller, executing 210 the model controller using the snapshot and the modified control parameter in an offline environment separate from the online environment, and comparing 212 an output of the executed model to the output of the online process controller.

In an embodiment, selecting 202 an offline model of an online process controller includes copying a code representation of the online process controller from the online environment to the offline environment. The copying may be implemented for example, by dragging and dropping a code representation of the online process controller from the online environment displayed on a user display screen to the offline environment displayed on the user display screen. In another embodiment, after for example, a process upset in the online environment, method 200 further includes iteratively modifying a control parameter of the model controller to duplicate the upset conditions, executing the model controller using the snapshot and the modified control parameter in an offline environment separate from the online environment, comparing an output of the executed model controller to the output of the online process controller, determining at least one of a cause of the upset and a control parameter that facilitates reducing a severity of the upset based on the comparison, and modifying the determined control parameter in the online process controller to match the determined control parameter in the model controller.

During execution of the model controller, an output of the model controller is prevented from affecting outputs in the online environment. Additionally, during execution of the model controller one or more inputs of the model controller maybe automatically varied to determine a correlation between the varied one or more inputs and the output of the model controller. Such a process may be used to simulate an upset that occurred in the online computing environment that yielded an unsatisfactory performance, for example, but not limited to, a component trip, poor product quality, or damage to a component. To facilitate the simulation process historical data representing input data to the process controller may be stored on a data storage device accessible to process control system 100 or that is a part of process control system 100. The stored historical data representing input data received by the process controller is retrieved by a processor 120 executing the offline computing environment, which may be the same processor executing the online computing environment. The retrieved data is applied to the input of the model controller. The model controller is then executed in the offline computing environment using the retrieved data. An output of the model controller can be compared to the stored historical data to analyze the behavior of the model controller to various input changes, and one or more of the parameters that controls the operation of the model controller can be adjusted using the comparison as a guide to provide a stable operation of the model controller. The modified parameter may then be imported to the process controller in the online computing environment after having been validated in the offline computing environment.

Figure 3:
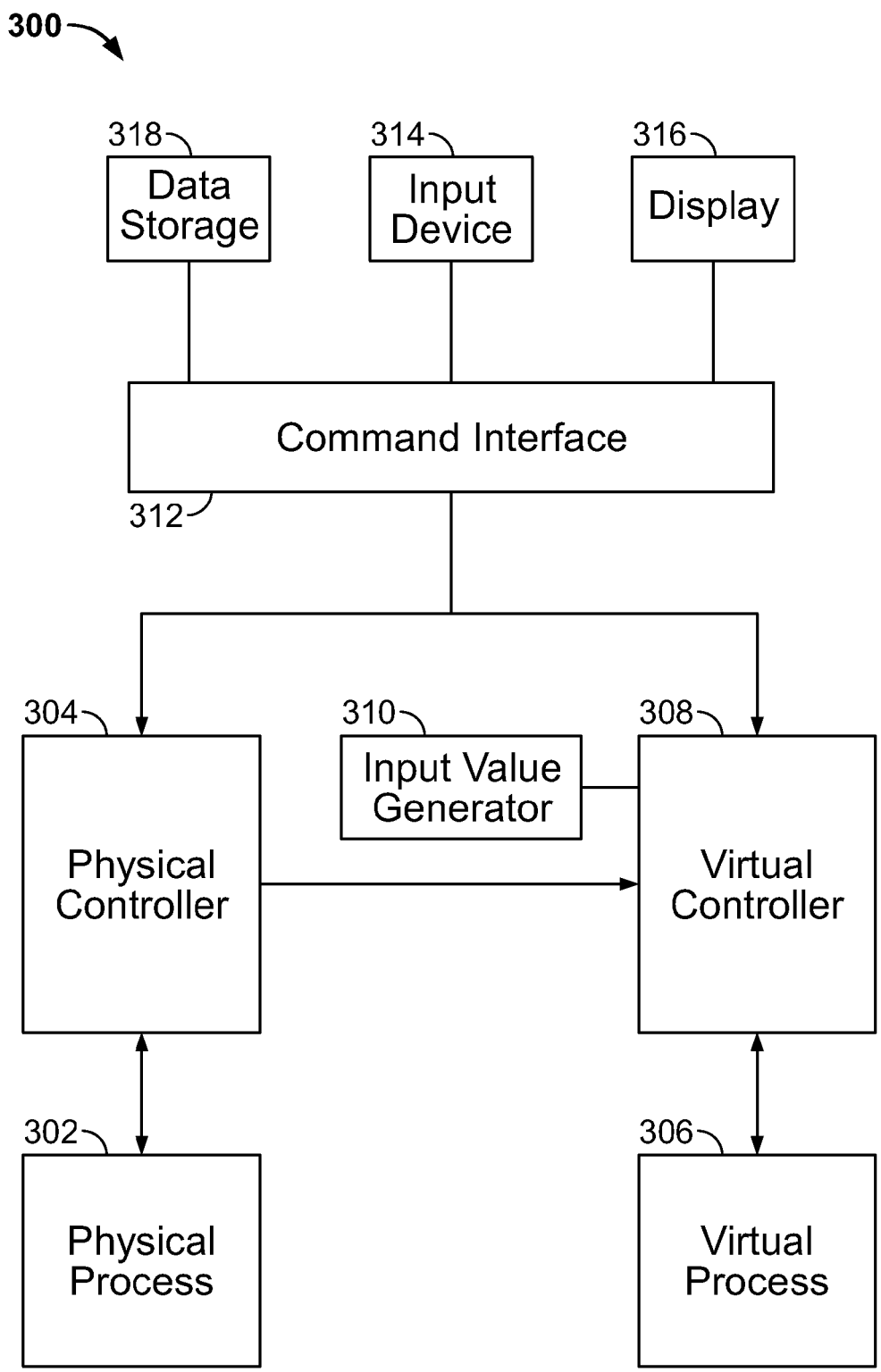

FIG. 3 is a schematic block diagram of an offline code validation system 300 that may be used with process control system 100 (shown in FIG. 1). In the exemplary embodiment, offline code validation system 300 includes a physical process or online computing environment 302. A process controller 304 is a physical device that may be embodied in hardware, firmware, or software, and is a physical device in that process controller 304 is operable in online computing environment 302 to receive input values from one or more sensors positioned about a physical plant and to generate output values using executable process controller code and the input values. The output values are transmitted to physical plant components to control a process plant function. The one or more sensors may include hardware positioned at particular locations in the plant or may be virtual sensors that compute a value for a process parameter that is not measurable or where a sensor is not currently located, or where a hardware sensor is located, but has failed.

Offline code validation system 300 also includes an offline computing environment 306 or virtual process executing concurrently with online computing environment 302, and an offline or virtual model controller 308 that models process controller 304 operable in the offline computing environment 306 to receive input values from at least one of the sensors and an input value generator 310 and to generate output values using executable offline model code and the input values. Offline code validation system 300 includes a command or user interface 312 configured to receive a selection from a user through one or more input devices 314, such as, but not limited to, pointing devices, haptic or gestural devices keyboards, and touch screens. The selection indicates representations of one or more process controllers 304 displayed on a display 316 of user interface 312. User interface 312 is configured to permit a user to copy the received selection from online computing environment 302 to offline computing environment 306 and to channel the received input values from online computing environment 302 to the offline computing environment 306. In another embodiment, the received input values are channeled from online computing environment 302 to the offline computing environment 306 directly without using user interface 312. Model controller 308 is synchronized with process controller 304 to permit model controller 308 to simulate the control of process controller 304 in a safe environment to facilitate analyzing the operation of process controller 304. User interface 312 is configured to permit the user to adjust a parameter of model controller 308, for example, but not limited to coefficients and/or factors in an algorithm of the model controller 308. Offline code validation system 300 also includes a data storage device 318 configured to store historical data representing input data received by process controller 304.

Offline code validation using a virtual controller and a high fidelity process model is used to equip the commissioning and maintenance engineer with a tool to troubleshoot the control system process loops or groups of process loops and subsystems to facilitate improving the plant operational efficiency. The physical process and control systems remain undisturbed and continue in their own state of operation. Being "offline", the tool does not act on any physical devices.

Offline code validation, as used herein, is applicable to both open and closed loop control systems. The advantage of having robust process model and offline controls is to enable the engineering and maintenance teams to validate the modifications made to the control system.

The snapshot of the controls state of physical controller is captured and transferred to the virtual controller. The process model states at pre-determined (the "fineness" of the intervals can be determined based on process) intervals (0-100%) are saved and readily available in the database. The 0-100% MCR (maximum continuous rating) of any process uses a designator to identify the state of the process.

For example: The maximum continuous rating of a steam generator may be 100 tons/hr. The designator of this process would be "steam flow". The instantaneous steam flow would enable a user to know the state of the process. Some processes may require more than one measured parameter to decide the state of the process.

The snapshot of the physical controller is scanned for the "designator" value and its corresponding process model state from the existing database. After this step, the virtual controller and identified process state are synchronized. After attaining the synchronization between the virtual controller and process model, it is expected that the process remain at that state infinitely.

In an exemplary embodiment, assume that fuel gas heater loop is not working properly during transients on a heat recovery steam generator (HRSG) (IP drum level changes) again coupling it to transients on generator load. To maintain the fuel gas heater loop (may be tuning or changing control sequence), the existing troubleshooting methodology would involve the procuring the as_running control software and close the loop using the process model. This close loop simulation is used to re-create the problem occurred in the plant. Once the problem is re-created, the "fix" is "designed" and "reviewed" and applied. The "fixed" control solution is validated again under the close loop environment. The final solution is transferred in to physical platform. If only few constants (tuning) are required to be changed, they would be done online after due calculation/attention. The validation occurs on the live process expecting the transient to occur again. The transient may not be able to be created some times (process disturbance) or if it is created or reoccurred on its own, the amplitude and/or frequency may not be same as that of the original disturbance to properly validate the solution.

However, using embodiments of the present invention, the exact control state is captured and implanted in to the virtual controller; hence the re-production of the behavior becomes simple. The recorded behavior of the physical process provides the amplitude, frequency of the transient. In the virtual process using some "handles", the required transient can be configured quickly and applied on modified control configuration to observe the behavior. The virtual process could be maneuvered around the state of concern with fabricated transients of different amplitude and frequency to analyze the stability of the solution.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 120, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is providing a platform for on-site modification and validation of process control system control code prior to download into a physical control system and to enable optimization of the existing control boundary. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of offline code validation provides a cost-effective and reliable means to permit the validation of a control system logic code. More specifically, the method and system described herein facilitate providing a simulation platform for on-site modification and validation prior to download of the modified control logic into a physical control system. In addition, the above-described method and system facilitate enabling optimization of the existing control boundary. As a result, the method and system described herein facilitate validating control in a process control system after modification and before installation in the live operating environment in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of offline code validation comprising:
   selecting an offline model of an online process controller operating in an online environment from a plurality of selectable models by copying a code representation of the online process controller from the online environment to an offline environment that is separate from the online environment;
   capturing from the online process controller operating in the online environment a snapshot of a current state of the online process controller;
   establishing the captured state in the model controller;
   modifying a control parameter of the model controller;
   executing the model controller using the snapshot and the modified control parameter in the offline environment; and
   comparing an output of the executed model controller to the output of the online process controller.

2. A method in accordance with claim 1, further comprising simulating an upset in the online environment.

3. A method in accordance with claim 1, wherein selecting an offline model of an online process controller further comprises dragging and dropping a code representation of the online process controller from the online environment displayed on a user display screen to the offline environment displayed on the user display screen.

4. A method in accordance with claim 1, further comprising:
   after a process upset in the online environment, iteratively:
      modifying a control parameter of the model controller to duplicate the upset conditions;
      executing the model controller using the snapshot and the modified control parameter in an offline environment separate from the online environment;
      comparing an output of the executed model controller to the output of the online process controller;
      determining at least one of a cause of the upset and a control parameter that facilitates reducing a severity of the upset based on the comparison; and
      modifying the determined control parameter in the online process controller to match the determined control parameter in the model controller.

5. A method in accordance with claim 1, further comprising preventing an output of the model controller from affecting outputs in the online environment.

6. A method in accordance with claim 1, further comprising automatically varying one or more inputs of the model controller and determining a correlation between the varied one or more inputs and the output of the model controller.

7. A method in accordance with claim 1, further comprising storing historical data representing input data to the process controller.

8. A method in accordance with claim 1, further comprising storing historical data representing output data from the process controller.

9. A method in accordance with claim 1, further comprising:
   retrieving stored historical data representing input data received by the process controller;
   applying the retrieved data to the input of the model controller;
   executing the model controller in the offline computing environment using the retrieved data;
   comparing an output of the model controller to the stored historical data representing output data from the process controller; and
   adjusting a parameter of the model controller using the comparison to provide a stable operation of the model controller.

10. A method in accordance with claim 9, wherein retrieving stored historical data comprises retrieving stored historical data that includes data acquired during an upset of a process operation.

* * * * *